(12) United States Patent
Hickman

(10) Patent No.: US 6,206,944 B1
(45) Date of Patent: Mar. 27, 2001

(54) LOW ASPECT RATIO DIESEL EXHAUST FILTER

(75) Inventor: David L. Hickman, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/418,855

(22) Filed: Oct. 15, 1999

(51) Int. Cl.⁷ .............................. B01D 39/20; C04B 35/64
(52) U.S. Cl. ............................ 55/523; 55/DIG. 30
(58) Field of Search .................. 55/523, DIG. 30; 60/311; 210/510.1

(56) References Cited

U.S. PATENT DOCUMENTS

| | | |
|---|---|---|
| 3,885,977 | 5/1975 | Lachman et al. . |
| 4,001,028 | 1/1977 | Frost et al. . |
| 4,420,316 | 12/1983 | Frost et al. . |
| 4,857,089 * | 8/1989 | Kitagawa et al. ............... 55/523 |
| 4,869,944 * | 9/1989 | Harada et al. ................... 55/523 |
| 5,069,697 * | 12/1991 | Hamaguchi et al. ............. 55/523 |
| 5,549,725 * | 8/1996 | Kasai et al. ..................... 55/523 |
| 6,101,793 * | 8/2000 | Nagai et al. ..................... 55/523 |

OTHER PUBLICATIONS

H. Mizuno et al., "Effect Of Cell Structure On Regeneration Failure Of Ceramic Honeycomb Diesel Particulate Filter", SAE Paper No. 870010 (1987).

* cited by examiner

*Primary Examiner*—Duane S. Smith
(74) *Attorney, Agent, or Firm*—Kees van der Sterre

(57) ABSTRACT

A porous ceramic filter offering both increased thermal mass and controlled exhaust flow performance for the filtration of particulates from diesel exhaust gases includes a wall-flow honeycomb filter body incorporating a plurality of parallel end-plugged cell channels traversing the body from filter inlet to filter outlet, the wall thickness, cell density, and outer dimensions of the honeycomb being selected to provide a honeycomb bulk density of at least about 0.50 grams/cm³ and an effective honeycomb length-to-diameter aspect ratio not exceeding about 0.9.

8 Claims, 3 Drawing Sheets

LOW ASPECT RATIO DIESEL EXHAUST FILTER

BACKGROUND OF THE INVENTION

The present invention relates to filters for the removal of particulate material from diesel engine exhaust streams, and more particularly to porous ceramic diesel exhaust filters of improved resistance to melting and thermal shock damage under conditions encountered in diesel exhaust systems.

U.S. Pat. No. 4,420,316 to Frost et al. discusses conventional ceramic wall-flow filter designs suitable for particulate filtration from diesel exhaust gases. As noted in that patent, cordierite ceramic materials of the kinds disclosed in U.S. Pat. Nos. 3,885,977 and 4,001,028 are commonly used for diesel particulate trap filters because they have properties which enable them to withstand the chemical and physical conditions to which they are subjected in the exhaust gas conditions found in diesel engines.

For diesel particulate filtration with these materials, honeycomb structures having cellular densities between about 10 and 300 cells/in2 (about 1.5 to 46.5 cells/cm$^2$), more typically between about 100 and 200 cells/in$^2$ (about 15.5 to 31 cells/cm$^2$), are considered useful to provide sufficient thin wall surface area in a compact structure. Wall thicknesses can vary upwards from the minimum dimension providing structural integrity, about 0.002 in. (about 0.05 mm.), but are generally less than about 0.06 in. (1.5 mm.) to minimize filter volume. A range of between about 0.010 and 0.030 inches (about 0.25 and 0.76 mm.) e.g., 0.017 inches, is most often selected for these materials at the preferred cellular densities. Filter aspect ratios (the ratio of filter length to filter diameter) in the range of 0.8–1.2 are usually specified to provide adequate filtration volume in a packaged unit of manageable diameter.

Interconnected open porosity of the thin walls may vary, but is most generally greater than about 25% of thin wall volume and usually greater than about 35% to allow fluid flow through the thin wall longer dimensions. Diesel filter integrity becomes questionable above about 70% open pore volume; volumes of about 50% are therefore typical. For diesel particulate filtration it is believed that the open porosity may be provided by pores in the channel walls having mean diameters in the range of about 1 to 60 microns, with a preferred range between about 10 and 50 microns.

Filtration efficiencies up to and in excess of 90% of the diesel exhaust particulates (by weight) can be achieved with the described cordierite materials. The filtration of a lesser but still significant portion (i.e. less than 50%) of the particulates may be desirable for other filtering applications including exhaust filtering of smaller diesel engines. Efficiencies, of course, will vary with the range and distribution of the size of the particulates carried within the exhaust stream. Volumetric porosity and mean pore size are typically specified as determined by conventional mercury-intrusion porosimetry.

A significant problem with these conventional filter designs, however, is susceptibility to damage during the required filter regeneration cycling. In conventional diesel exhaust filtration systems, exhaust gas flow rate and thus engine operating efficiency are affected by the increasing pressure drop across the filter caused by the accumulation on the filter of collected carbonaceous exhaust particulates (soot). Eventually, this pressure drop becomes unacceptable and regeneration of the filter becomes necessary. In conventional systems, the regeneration process involves heating the filter to initiate combustion of the soot, a process that is highly exothermic and, if uncontrolled, produces temperature spikes that can thermally shock and crack, or even melt, the filter structure.

This problem has been recognized and several approaches to address it have been proposed. One such approach involves the careful selection of filter design parameters, as reported by H. Mizuno, J. Kitagawa, and T. Hijikata in "Effect Of Cell Structure On Regeneration Failure Of Ceramic Honeycomb Diesel Particulate Filter", SAE Paper No. 870010 (1987). Within a filter cell density range of about 100–200 cells/in$^2$, Mizuno et al. found that increasing filter bulk density through increases in filter wall thickness and cell density effectively increased filter heat capacity, thereby moderating the peak filter temperatures encountered during filter regeneration. However, the thicker-walled filters exhibited higher pressure drops than standard filters, and in addition appeared to reach higher exhaust back-pressure levels in shorter times and at lower soot loadings than filters with thinner walls. These disadvantages suggested that an optimal combination of soot capacity and regeneration performance resided in a relatively narrow range of filter geometry characterized by filter wall thicknesses in the 0.012–0.017 inch range and cell densities in the 100–200 cells/in2 range.

Notwithstanding these findings, cordierite diesel exhaust filters produced in accordance with these guidelines, including standard commercial filters with cell densities of 100 cells/in and wall thicknesses of 0.017 inches, continue to experience thermal failures with unacceptable frequency in use and under test conditions approximating those found in diesel exhaust systems. Typical failures include filter cracking resulting from thermal stress and shock, as well as occasional melting resulting when large soot deposits undergo rapid and uncontrolled combustion.

SUMMARY OF THE INVENTION

The present invention provides porous ceramic particulate exhaust filters offering improved configurations that are significantly more resistant to thermal cracking and melting damage under typical diesel exhaust conditions than current filter designs. At the same time, the filters of the invention retain favorable initial exhaust gas back-pressures and promise resistance to soot-induced back-pressure buildup at least equivalent or superior to the best ceramic diesel particulate filter designs currently available.

In particular, the invention provides a ceramic filter for trapping and combusting diesel exhaust particulates which includes an end-plugged porous ceramic honeycomb structure with both increased thermal inertia and reasonable pressure drop in a diesel exhaust system. The increased thermal inertia or mass required in the filter is obtained by increasing the bulk density of the honeycomb structure to a value of at least 0.50 grams/cm3. At the same time, initial filter pressure drop and the rate of back-pressure increase during use are regulated by reducing the aspect ratio, but not the filtration surface area, of the filter. These changes in filter design provide filters with significantly increased thermal inertia that still retain particulate-free or "clean filter" exhaust gas pressure drops of 160 cm (water column) or less at conventional diesel exhaust gas flow rates.

Filter performance characteristics such as described can readily be secured in porous ceramic wall flow filter bodies of conventional end-plugged honeycomb structure and porosity, whether formed of cordierite or of other similarly porous but thermally durable ceramic materials, provided that the geometry of the filter bodies is maintained within specified ranges. Specifically, the filter bodies of the invention will be characterized by a honeycomb channel wall thickness of at least 0.016 inches and channel or cell densities of at least 150 cells/in$^2$ but with effective filter length-to-diameter aspect ratios not exceeding about 0.9, more typically about 0.2–0.85.

For purposes of the present description filter bulk density is simply the quotient of filter weight divided by the overall volume of the filter (i.e., the volume determined from the exterior dimensions of the filter). The filter aspect ratio is the ratio of the length of the filter along the filter axis parallel to the direction of the end-plugged channels to the effective diameter of the filter. The effective diameter of a filter of non-circular cross-section is taken to be the diameter calculated from the area of the filter cross-section perpendicular to the channel axis if converted to circular shape. The filter of course need not be circular in cross-section but may be of circular, oval, square, rectangular or any other cross-sectional shape that may be dictated by the particular diesel exhaust system design selected for use.

BRIEF DESCRIPTION OF THE DRAWINGS

The invention may be further understood by reference to the drawings, wherein.

DETAILED DESCRIPTION

Porous ceramic diesel filters of the type herein described are referred to as "wall flow" filters since the flow paths resulting from alternate channel plugging require the fluid being treated to flow through the porous ceramic cell walls prior to exiting the filter. As the art is well aware, the primary cause of pressure drop for a wall flow gas filter arises from the flow resistance associated with the passage of the gas through the wall. This resistance is affected by the porosity and thickness of the wall and, for the filter as a whole, the total or aggregate wall surface area available for filtration. If wall porosity is fixed, then wall flow resistance is found to be directly proportional to the wall thickness and inversely proportional to the aggregate wall area, referred to as the filter geometric surface area (GSA).

Figure 1:
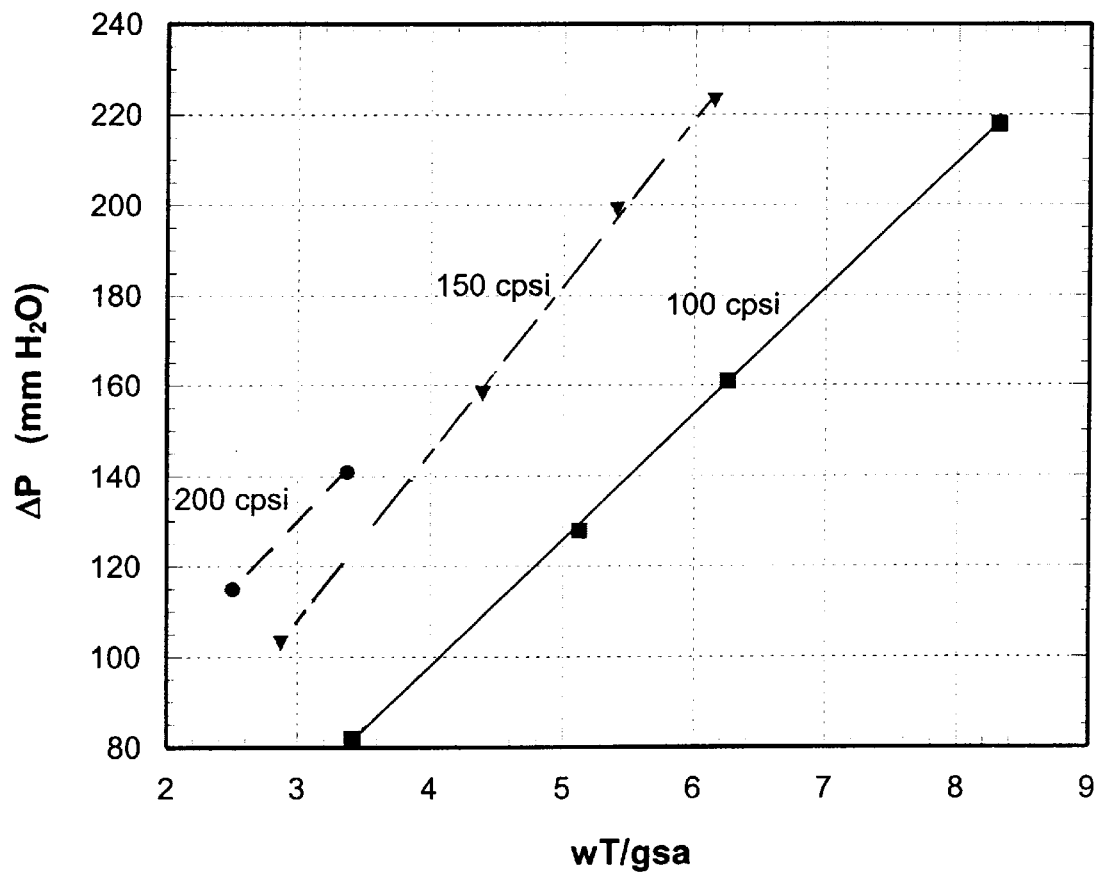
FIG. 1 presents exhaust flow back-pressure data for a series of porous ceramic filters of constant porosity but differing cell density and cell wall thickness.

FIG. 1 of the drawing presents representative back-pressure data for several conventional porous cordierite diesel filters of constant porosity but differing cell density and cell wall thickness, taken from the literature. In that graph, filter back-pressure ΔP, shown on the vertical graph axis, is plotted against filter wall thickness and geometric surface area (GSA) on the horizontal axis. More specifically, the horizontal scale indicates the ratio of filter wall thickness to filter geometric surface area (wT/gsa) for each filter design tested. Three different cell densities are plotted, but all filters are of the same overall dimensions.

The pressure testing was conducted at a constant gas flow rate of about 1.3 m$^3$/minute (gas volumes as measured at 1' atmosphere and 20° C.). The observed differences in flow resistance are attributable principally to the differences in wall thickness and geometric surface area. As expected, the data reflect a linear dependence of filter back-pressure on the ratio of filter wall thickness to filter geometric surface area for these filters.

The data in FIG. 1 do not reflect clearly the effects of laminar flow rate and gas expansion/contraction on filter back-pressure. That is, the pressure drop across a honeycomb filter substrate also depends on the resistance to laminar flow of gas down the cell channels and, as a second order effect, the extent of gas contraction and expansion occurring as the gas traverses the cellular structure.

Figure 2:
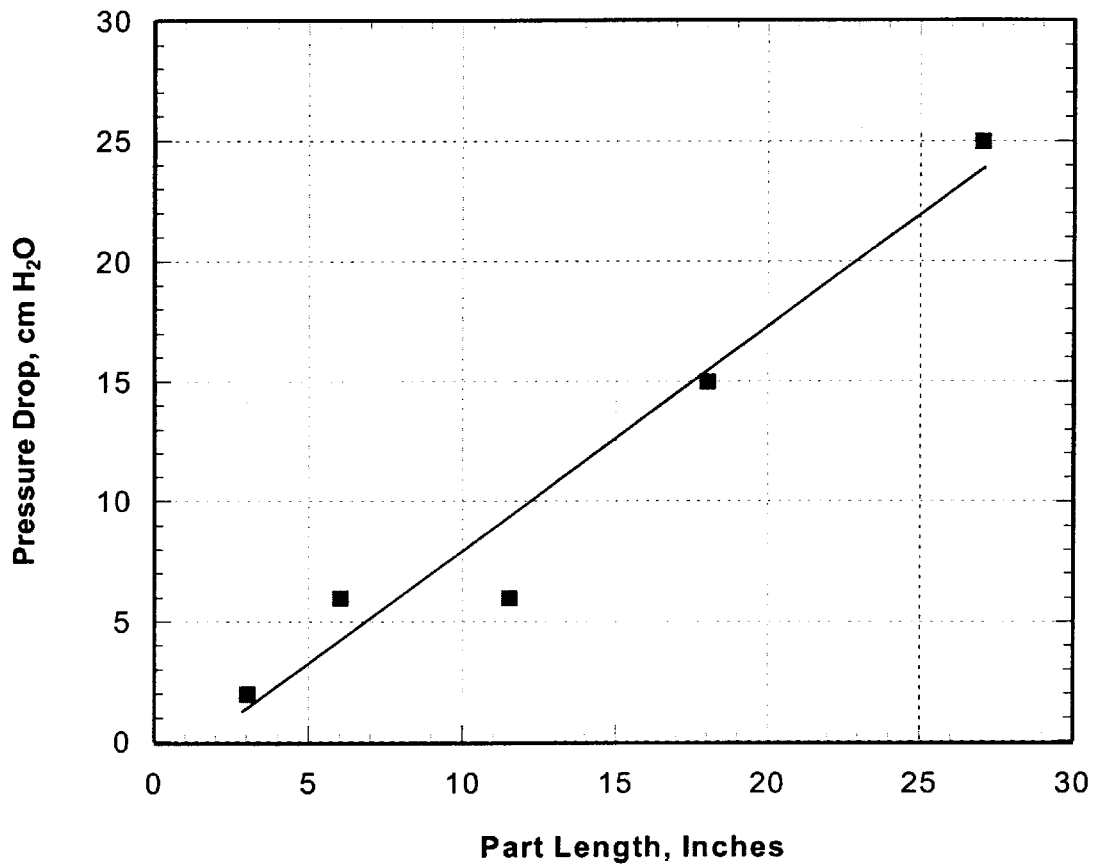
FIG. 2 plots filter back-pressure versus filter aspect ratio for a series of porous ceramic filters of otherwise identical geometry, and FIG. 3 compares the relative rates of filter back-pressure increase due to particulate accumulation for a series of porous ceramic filters of identical volume and cell design but differing aspect ratio.

One manifestation of this effect is illustrated in FIG. 2 of the drawing, which is a plot of filter back-pressure (Pressure Drop in cm of $H_2O$) versus filter length (in inches) for a series of filters of identical wall thickness, cell density and volume, but varying aspect ratio. Although the geometric surface areas of these filters are essentially equivalent, such that wall flow resistance is nearly invariant, significant variations in back-pressure are observed. These are considered to arise from fluid flow and gas compression effects.

Filters provided in accordance with the present invention take advantage of these hydraulic effects to provide filters with higher bulk density and therefore higher thermal inertia than previously considered practical. These designs are not only more resistant to undue heating during the regeneration cycle than the commercial designs of the prior art, but also offer favorable initial pressure drop and resistance to plugging equivalent to or better than those of conventional filters.

This combination of properties is secured through the adoption of specific low-aspect-ratio filter designs that more effectively control hydraulic back-pressure effects encountered in actual use. Particularly preferred filter geometries offering useful regeneration heat moderation and low pressure drop are those with filter bulk densities in the range of 0.60–0.85, cell densities in the range of about 200–300 cells/in2, wall thicknesses in the range of about 0.016–0.030 inches, and aspect ratios within the range of about 0.2–0.85. Within this region of honeycomb design, clean filter pressure drops well below 160 cm (water column) at exhaust gas flow rates of 1.3 m$^3$/min. or lower can readily be achieved.

A further and previously unreported advantage of these low aspect ratio filter designs appears to be a reduction in the frequency of filter regeneration that is required in use. This advantage results from the fact that the increases in filter back-pressure arising from the accumulation of particulate material on the walls of the filter inlet channels occur more slowly in low-aspect-ratio filters than in filters of conventional design. Thus the intervals between required filter regeneration cycles can apparently be considerably extended through the adoption of a low-aspect-ratio design.

For new filters, or during an initial period of filter use interval immediately following a complete filter regeneration, pressure drop across the filter increases approximately linearly over time with the steady accumulation of new particulate material on the inlet channel walls of the filter. However, the rate of increase during this initial use interval, and over much of the ensuing normal filter use interval, is found to be highly dependent on the aspect ratio of the filter, other geometric variables such as wall thickness, cell density, and filter volume being constant.

Figure 3:
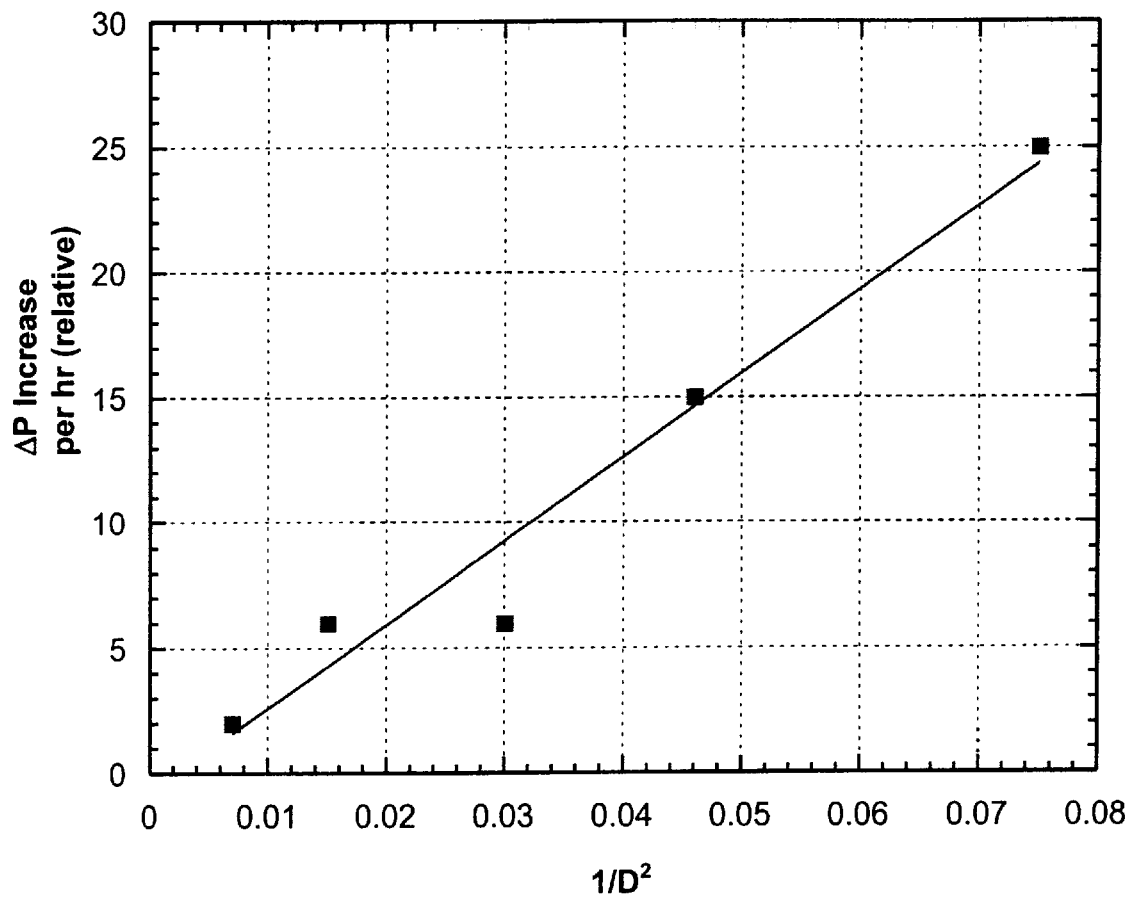

FIG. 3 of the drawing illustrates this effect in a graph showing the relative rate of back-pressure increase per unit of time as a function of filter aspect ratio for four different filter shapes. The back-pressure increase rate (ΔP Increase per hour), indicated on a relative scale on the vertical axis, is plotted against the filter aspect ratio factor $1/D^2$ (inverse Diameter squared) on the horizontal axis of the graph. The filters tested were all of the same cell density, wall thickness and volume. The strong dependence of filter back-pressure build-up rate on the filter aspect ratio is shown by the approximately linear dependence of that rate on the inverse square of the filter diameter.

A representative example of a filter design provided in accordance with the invention, and the performance advantages resulting therefrom, may be better understood from the following illustrative example, which is not intended to be limiting.

EXAMPLE

A cylindrical cordierite ceramic honeycomb of 5.66 inch diameter and 4.7 inch length, having about 200 cells per square inch of honeycomb frontal surface area traversing its length and with a 0.020 inch wall thickness, is provided by first extruding a plasticized mixture of clay, talc, alumina and graphite through a honeycomb extrusion die to form a green honeycomb. The green honeycomb is then dried and fired to produce a fired honeycomb having a thermal expansion coefficient of about $5 \times 10^{-7}/°$ C. and interconnecting wall porosity of about 50% by volume. The average pore size in the channel walls is about 13 $\mu$m.

Half of the channels of the fired honeycomb are plugged at their inlet ends with a ceramic sealing compound in a checkerboard plugging pattern, and the remaining channels are similarly plugged at their outlet ends. The plugged honeycomb is thereafter fired again to cure the ceramic seals and permanently plug the channels to form a wall-flow filter body. The result is a plugged, fired honeycomb wall filter with a length-to-diameter aspect ratio of about 0.83 and a open frontal area providing a filter bulk density of 0.62 g/cm$^3$ of filter volume.

The mounting of a fired honeycomb filter produced as described involves positioning the filter snugly within a cylindrical steel filter enclosure with a refractory resilient mat disposed between the filter sidewall and the wall of the enclosure. The ends of the enclosure may then be provided with inlet and outlet cones for channeling exhaust gas into and through the alternately plugged channels and porous walls of the filter.

To preserve the reduced aspect ratio of this filter and insure that the entire volume and wall structure thereof remains available for exhaust filtering, the honeycomb mounting in this particular case will be carried out in such a way that the front and rear faces of the honeycomb remain entirely unobstructed. Alternatively, the filter could be extruded and fired at slightly larger cylinder diameter, e.g., a fired outer diameter of about 6.4 inches, and then conventional edge gasketing and retention sleeves used to fix the honeycomb in the enclosure without concern for the resulting drop filter volume and wall surface area.

Assuming a test exhaust gas flow rate of 1.3 m$^3$/minute (Standard gas temperature and pressure), extrapolation from "clean filter" pressure drop data reported in the literature for filters of the same cell density (but with higher aspect ratios and lower wall thicknesses and bulk densities), indicate an initial pressure drop of about 13 cm water column for this filter at the same exhaust flow rate. This initial pressure drop is comparable to prior art filters of higher aspect ratio, but the bulk density of the present filter is significantly higher than the prior art filters, indicating that the resistance of the filter to temperature spiking during the regeneration cycle will be significantly improved.

Another significant performance advantage of this filter design is expected to reside in its reduced rate of pressure drop increase as soot is collected by the filter in actual use. As indicated in FIG. 3 of the drawing, the rate of pressure drop increase with soot accumulation in these filters is expected to depend strongly on the aspect ratio of the filter, with low aspect filters offering a significant performance advantage over higher aspect filters of the same volume, cell density and wall thickness. Based on the magnitude of this effect as reflected in the data reported in FIG. 3, the rate of pressure drop increase with soot accumulation for the 0.83 aspect ratio filter of this example will be approximately 25% less than the rate of increase for a 1.2 aspect ratio part of the same volume, cell density and wall thickness. And, hydraulic principles indicate that the filter of the example will have a slightly greater soot holding capacity before regeneration is required than the higher aspect filters of the prior art.

Additional examples of diesel particulate filters covering a range of aspect ratios, wall thicknesses and bulk densities are reported in Table 1 below. Several Standard filter designs taken from the literature, along with representative examples of Low aspect ratio, High bulk density filter designs provided in accordance with the invention, are included. Recorded for each of the filters reported in the Table are the size, aspect ratio, wall thickness and bulk density of the filters, along with estimated initial pressure drop and back-pressure increase data where available.

TABLE I

Filter Designs

| | Standard Filters | | | | | High Density, Low Aspect Ratio Filters | | | |
|---|---|---|---|---|---|---|---|---|---|
| | A | B | C | D | E | F | G | H | I |
| Diameter (inches) | 5 | 5 | 5 | 5 | 5 | 5.7 | 6 | 6.5 | 7 |
| Length (inches) | 6 | 6 | 6 | 6 | 6 | 4.6 | 4.2 | 3.6 | 3.1 |
| Wall Thickness (inches) | 0.017 | 0.012 | 0.015 | 0.017 | 0.022 | 0.020 | 0.025 | 0.030 | 0.020 |
| Cell Density (cells/in2) | 100 | 200 | 200 | 150 | 150 | 200 | 250 | 200 | 300 |
| Aspect Ratio | 1.2 | 1.2 | 1.2 | 1.2 | 1.2 | 0.82 | 0.72 | 0.54 | 0.43 |
| Filter Volume (inches3) | 118 | 118 | 118 | 118 | 118 | 118 | 118 | 118 | 118 |
| Filter G.S.A. (inches2) | 3909 | 5531 | 5248 | 4567 | 4214 | 4786 | 4508 | 3847 | 5345 |
| Initial Pressure | 128 | 115 | 141 | 158 | 223 | 131 | 142 | 160 | 110 |

TABLE I-continued

Filter Designs

| | Standard Filters | | | | | High Density, Low Aspect Ratio Filters | | | |
|---|---|---|---|---|---|---|---|---|---|
| | A | B | C | D | E | F | G | H | I |
| Drop (cm H2O) | | | | | | | | | |
| Open Frontal Area | 69% | 69% | 62% | 63% | 53% | 51% | 37% | 33% | 43% |
| Filter Bulk Density | 0.39 | 0.39 | 0.48 | 0.47 | 0.59 | 0.61 | 0.80 | 0.84 | 0.72 |
| Projected plugging rate (cm H20/hr.) | 140 | 70 | 100 | 130 | 200 | 105 | 100 | 95 | 80 |

As is evident from a study of the data in Table 1, the low aspect ratio filters of the invention offer significantly increased thermal mass (bulk density) when compared with the density levels employed in the prior art. Yet the filter back-pressures and pressure drop increase rates expected with these filters are at least equivalent to and typically significantly better than those measured for prior art filters. Thus substantial reductions in the incidence of regeneration damage, and useful improvements in soot capacity and soot plugging rates, are anticipated.

I claim:

1. A ceramic filter for trapping and combusting diesel exhaust particulates comprising an end-plugged porous ceramic honeycomb structure having:

a honeycomb bulk density of at least about 0.50 grams/$cm^3$; and an effective length-to-diameter aspect ratio not exceeding about 0.9.

2. A ceramic filter in accordance with claim 1 which has a particulate-free exhaust gas pressure drop not exceeding about 160 cm $H_2O$ at an exhaust gas flow rate of 1.3 $m^3$/min.

3. A ceramic filter in accordance with claim 2 which is composed substantially of cordierite.

4. A diesel exhaust particulate filter comprising a plugged, wall-flow honeycomb filter body composed of porous ceramic material and comprising a plurality of parallel end-plugged cell channels traversing the body from a frontal inlet end to an outlet end thereof, wherein:

the honeycomb body has a honeycomb bulk density of at least about 0.50 grams/$cm^3$, a cell density of at least 150 cells per square inch of frontal inlet area, a cell wall thickness of at least about 0.016 inches, and an effective length-to-diameter aspect ratio not exceeding about 0.9.

5. A diesel exhaust particulate filter in accordance with claim 4 which is composed substantially of cordierite.

6. A diesel exhaust particulate filter in accordance with claim 5 which has an effective length-to-diameter aspect ratio in the range of about 0.2–0.85.

7. A diesel exhaust particulate filter in accordance with claim 6 which has a filter bulk density in the range of 0.60–0.85, a cell density in the range of about 200–300 cells/in2, and a cell wall thickness in the range of about 0.016–0.030 inches.

8. A diesel exhaust particulate filter in accordance with claim 7 having a clean filter pressure drop not exceeding 160 cm (water column) at an exhaust gas flow rate not exceeding 1.3 $m^3$/min.

* * * * *